United States Patent [19]

Andrews

[11] Patent Number: 5,121,489

[45] Date of Patent: Jun. 9, 1992

[54] TRACING METHOD FOR IDENTIFYING PROGRAM EXECUTION PATHS USING A TRACE POINTS BIT MAP WITH ONE-TO-ONE CORRESPONDENCE WITH EMBEDDED TRACE POINTS

[75] Inventor: Paul N. Andrews, Tucson, Ariz.

[73] Assignee: International Business Machines Corporation, Armonk, N.Y.

[21] Appl. No.: 746,226

[22] Filed: Jun. 27, 1991

Related U.S. Application Data

[62] Division of Ser. No. 227,844, Aug. 2, 1988, Pat. No. 5,067,073.

[51] Int. Cl.$^5$ .................................. G06F 11/10
[52] U.S. Cl. ...................... 395/375; 364/DIG. 1; 364/246; 364/259.8; 364/261.6; 364/267.3; 364/267.4; 371/19
[58] Field of Search ... 364/200 MS File, 900 MS File; 371/19

[56] References Cited

U.S. PATENT DOCUMENTS

| | | | |
|---|---|---|---|
| 3,427,443 | 2/1969 | Apple et al. | 235/153 |
| 3,707,725 | 12/1972 | Dell Heim | 364/200 |
| 3,955,180 | 5/1976 | Hirtle | 364/200 |
| 4,205,370 | 5/1980 | Hirtle | 364/200 |
| 4,423,508 | 12/1983 | Shiozaki et al. | 371/16 |
| 4,462,077 | 7/1984 | York | 364/200 |
| 4,571,677 | 2/1986 | Hirayama et al. | 364/200 |
| 4,598,364 | 7/1986 | Gum et al. | 364/200 |
| 4,636,940 | 1/1987 | Goodwin, Jr. | 364/200 |
| 4,866,665 | 9/1989 | Haswell-Smith | 364/200 |

FOREIGN PATENT DOCUMENTS 0202628 11/1986 European Pat. Off.

OTHER PUBLICATIONS

Bauer, et al, "Method of Tracing Asynchronous Multiple Level Interrupts", IBM Technical Disclosure Bulletin, vol. 21, No. 12, May 1979, pp. 4783-4785.

Morse, et al, "DOS/AMAP Trace", IBM Technical Disclosure Bulletin, vol. 14, No. 3, Aug. 1971, pp. 855-856.

H. Ruzicka, "Special Instruction to Initiate and Supplement Program Trace Functions", IBM Technical Disclosure Bulletin, vol. 12, No. 6, Nov. 1969, pp. 771-772.

Harward, L. D., "PL/1 Trace Program", IBM Technical Disclosure Bulletin, vol. 13, No. 4, Sep. 1970, pp. 855-857.

Hunt, T. A., "General Trace Facility", IBM Technical Disclosure Bulletin, vol. 15, No. 8, Jan. 1973, pp. 2446-2448.

Klein, et al, "Recording Trace Data in Restrictive Environments", IBM Technical Disclosure Buleltin, vol. 30, No. 10, Mar. 1988, pp. 251-253.

K. Soule, "Algorithm for Tracing Execution Paths to a Given Location in a Program", IBM Technical Disclosure Bulletin, vol. 14, No. 4, Sep. 1971, pp. 1016-1019.

East, et al, "Relocate and Multiprocessor Map and Trace Monitor", IBM Technical Disclosure Bulletin, vol. 15, No. 4, Sep. 1972, pp. 1377-1378.

Geer, et al, "Instruction Stream Trace", IBM Technical Disclosure Bulletin, vol. 26, No. 11, Apr. 1984, pp. 6217-6220.

*Primary Examiner*—Thomas C. Lee
*Assistant Examiner*—Krisna Lim
*Attorney, Agent, or Firm*—M. W. Schecter; F. E. Anderson

[57] ABSTRACT

An improved method of tracing the paths used in execution of a computer program is disclosed. The method includes using the state of a single bit to denote the referencing of a trace point in the program. The trace points are logically located near the program branch points. One or more bit maps are arranged in a known state at the beginning of program execution and the state of a particular bit in one of the bit maps is set when the associated trace point is referenced. Each bit is associated with a particular trace point according to its position in the bit maps. After program execution, the bit maps are compared to the source listing to determine which trace points were referenced. The use of single bits to denote the referencing of trace points minimizes the degradation of performance efficiency of the target program. Because the bit maps are initialized to a known state at the beginning of each program execution and transferred to retentive storage at the end of each program execution, tracing occurs continuously. Tracing means embedded in a target program and operating according to the aforementioned tracing method, and a method of installing such embedded tracing capability in a target program, are also disclosed.

2 Claims, 2 Drawing Sheets

TRACING METHOD FOR IDENTIFYING PROGRAM EXECUTION PATHS USING A TRACE POINTS BIT MAP WITH ONE-TO-ONE CORRESPONDENCE WITH EMBEDDED TRACE POINTS

This Application is a divisional of application Ser. No. 07/227,844, filed Aug. 2, 1988, now U.S. Pat. No. 5,067,073.

BACKGROUND OF THE INVENTION

1. Field of the Invention

The subject invention relates to an improved method of tracing the program paths used in execution of a computer program. In addition, the subject invention includes an embedded tracing program operating according to the tracing method and a method of installing such self-tracing capability into a program.

2. Description of the Related Art

Knowledge of the paths used in execution of a program in a computer system is helpful in both designing the program and diagnosing errors that occur once the program is in the field. A program for which knowledge of the paths used in execution is of interest is herein referred to as a "target" program. One method of acquiring such knowledge is herein referred to as a "predictive" method. Predictive methods include means, such as separate programs, which analyze all of the possible paths of execution of a target program. An example of such a predictive method is disclosed in an article by K. Soule, *IBM Technical Disclosure Bulletin*, Vol. 14, No. 4, Sep. 1971, pp. 1016-1019. Predictive methods can be quite helpful during the development of the program because they permit a programmer to simulate different possible environments of a target program during its expected use. Although predictive methods are time consuming because of the need to analyze all possible paths of execution of a target program, they are adequate for program development because the knowledge gained therefrom is large. Once a program is in the field, however, predictive methods are inefficient for analyzing program errors or failures. Once a program error has occurred, there is no benefit from predicting all possible paths of execution of that program. Of interest is the exact path of execution which lead to the error, so that it may be corrected. This need for efficiency is magnified by customers' need to have their program maintained in working condition. Thus, efficiency often requires the ability to determine the paths used in execution of a target program which lead to an error, rather than the ability to use predictive methods to foresee possible future errors.

Determining the paths used in execution of a target program is known as "tracing" the program. The tracing of program execution may be accomplished using either hardware or software. Tracing using hardware is accomplished by physically wiring a storage device into the logical circuits of the computer system being controlled by the target program to determine their use or nonuse. Hardware tracing methods are disclosed in articles by D. G. East, et al, *IBM Technical Disclosure Bulletin*, Vol. 15, No. 4, Sep. 1972, pp. 1377-1378 and C. P. Geer, et al., *IBM Technical Disclosure Bulletin*, Vol. 26, No. 11, April 1984, pp. 6217-6220. The primary problem with hardware tracing methods is in properly connecting the storage device to the logical circuits controlled by the target program. In increasingly complex modern computer systems, the circuitry of which varies significantly between computer systems, it is nearly impossible to make the connection of the storage device a simple task.

Software tracing methods exist in many forms, often including parent or child programs which operate in conjunction with a target program. A parent program actually directs the execution of the target program, monitoring it as execution proceeds. A child program is called by the target program whenever certain trace points in the target program are referenced during execution. By "referenced" it is meant that a particular trace point is reached in one of the possible paths of execution. Tracing methods using parent or child programs are inefficient because the parent or child program interrupts the execution of the target program, thereby significantly increasing execution time. Thus, programs having means for tracing program execution embedded therein are preferable.

Tracing methods may also be classified according to the type of information recorded. One type of tracing method employs a "snapshot" of the computer system taken at regular intervals. Snapshots indicate the status of a computer system at the exact time they are taken or since the preceding interval. For example, the transient referencing of a trace point in the middle of an interval would be detected by a snapshot indicating the status since the last interval because the trace point was in fact referenced during the interval. However, the transient referencing would not be detected by a snapshot indicating the status at the exact time it is taken because the trace point would not be referenced at that time. Snapshot tracing methods are inefficient because the status of each trace point is recorded several times during execution of the target program, thereby significantly increasing execution time.

Other tracing methods are known, all suffering from one or more disadvantages. Some tracing methods include the recording of every program instruction, thereby drastically degrading system and program performance. Similar tracing methods attempt to overcome this problem by including the recording of only the most recently executed instructions. This method improves system and program performance compared to the aforementioned tracing method, but is still inefficient in that it does not focus on recording the paths used in execution of the target program. The method records all instructions of recent vintage, not just those indicating the direction taken at program branch points. A branch point is any location in the program from which two or more immediate paths of execution exist. For example, Bauer, et al (*IBM Technical Disclosure Bulletin*, Vol. 21, No. 12, May 1979, pp. 4783-4785) discloses merely tracing recent multiple level interrupts.

Other tracing methods reduce the degradation of system and program performance by including the recording of certain major events only. For example, Morse, et al (*IBM Technical Disclosure Bulletin*, Vol. 14, No. 3, Aug. 1971, pp. 855-856) discloses merely tracing such major events as I/O operations. Limiting the trace to major events does improve such performance over certain earlier tracing methods, but is again inefficient in that it does not focus on recording the path of execution of the target program. For example, Morse, et al record significant amounts of performance oriented data not actually required for tracing the paths used in execution of the target program. Recording this excess information significantly increases execution time. A similar tracing method disclosed by Ruzicka (IBM Technical Disclosure Bulletin, Vol. 12, No. 6, Nov. 1969, pp. 771-772) degrades performance by including the recording of separate records for each trace point.

Still other tracing methods include the recording of sequential tracing information. Sequential tracing methods record the order in which trace points were referenced during program execution, not merely which trace points were referenced regardless of time. For example, Harward (IBM Technical Disclosure Bulletin, Vol. 13, No. 4, Sep. 1970, pp. 855-857) discloses a tracing method including recording the referencing of trace points located at branch points of the target program. sequential tracing information is obtained by recording a different symbol at each trace point. the sequence of symbols recorded thus represents the sequence in which the trace points were referenced. However, performance is again degraded by the time and memory space required to generate and record a different symbol at each trace point.

Efficiency considerations require that tracing methods operate continuously during target program execution in the field. Without such continuous operation, the analysis of an error occurring during a non-tracing period would require re-execution of the target program. In addition, differences between program execution with and without tracing, such as those caused by timing considerations, could mask the analysis of certain errors by tracing or expose otherwise dormant errors.

SUMMARY OF THE INVENTION

In view of the foregoing, it is the principle object of this invention to improve methods of tracing the paths used in execution of a computer program.

Another object of the invention is a tracing method which minimizes the degradation of performance of the target program.

Still another object of the invention is a method for continuously tracing program execution in the field.

Still another object of the invention is an improved tracing means embedded in a target program.

Still another object of the invention is an improved method of installing embedded tracing capability in a target program.

Still another object of the invention is a method of installing embedded tracing capability in a target program which accommodates an unlimited number of trace points in the target program.

These and other objects of this invention are accomplished by a tracing method in which the state of a single bit denotes the referencing of a trace point having execution significance in a target program. The trace points are logically located near one of the program branch points. One or more bit maps are initialized to a known state at the beginning of program execution and the state of a particular bit in one of the bit maps is set when the associated trace point is referenced. Each bit is associated with a particular trace point according to its position in the bit maps. After program execution, or some other tracing interval, the bit maps are stored in retentive storage. The bit maps are then compared to the source listing to determine which trace points were referenced. The use of single bits to denote the referencing of trace points minimizes the degradation of performance of the target program. Because the bit maps are initialized to a known state at the beginning of each program execution and transferred to retentive storage at the end of each program execution, tracing occurs continuously.

Tracing means are embedded in a target program by inputting the instructions to accomplish the steps of the tracing method into a target program, including the reserving of system memory space to create the bit maps, initializing the bit maps to a known state, and setting the state of bits in the bit maps when associated trace points have been referenced. A method of installing embedded tracing capability into a target program includes determining the number of trace points in the program, inserting in the program the instructions for creating a bit map of known state in response to the prior determination, and inserting in the program the instructions for setting the state of a bit in response to the to the referencing of an associated trace point.

The foregoing and other objects, features and advantages of the invention will be apparent from the following more particular description of the preferred embodiments of the invention, as illustrated in the accompanying drawing.

DESCRIPTION OF THE PREFERRED EMBODIMENTS

Figure 1:
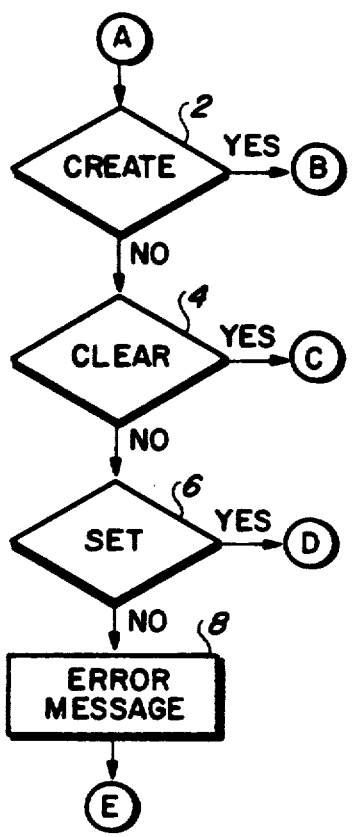
FIG. 1 is a simplified flowchart of the macro used for installing trace capability into a target program.
Figure 2:
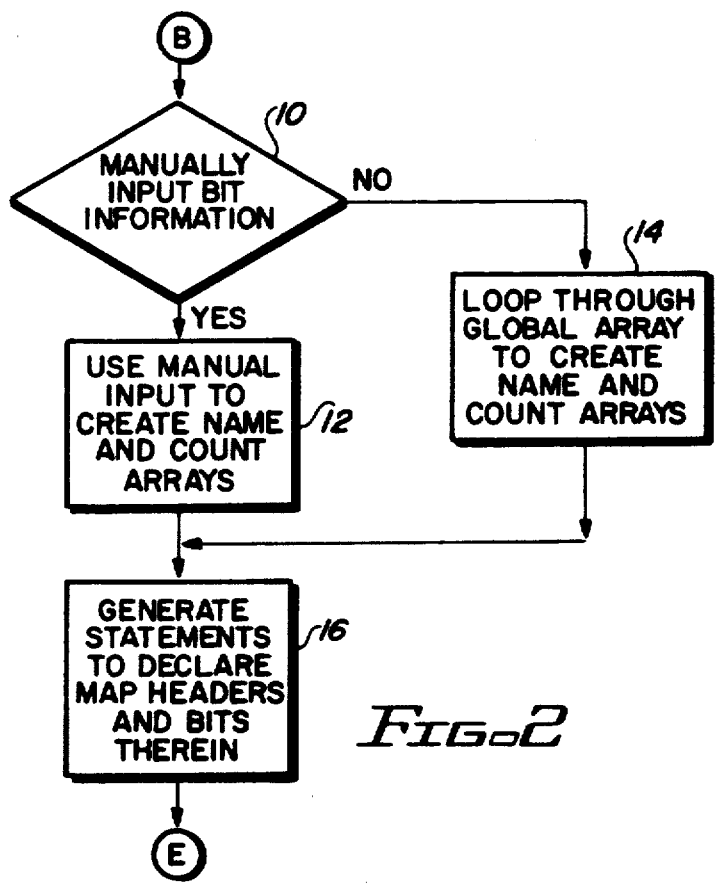
FIG. 2 is a flowchart of the CREATE keyword shown in FIG. 1.
Figure 3:
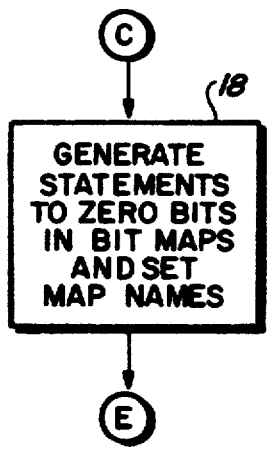
FIG. 3 is a flowchart of the CLEAR keyword shown in FIG. 1.
Figure 4:
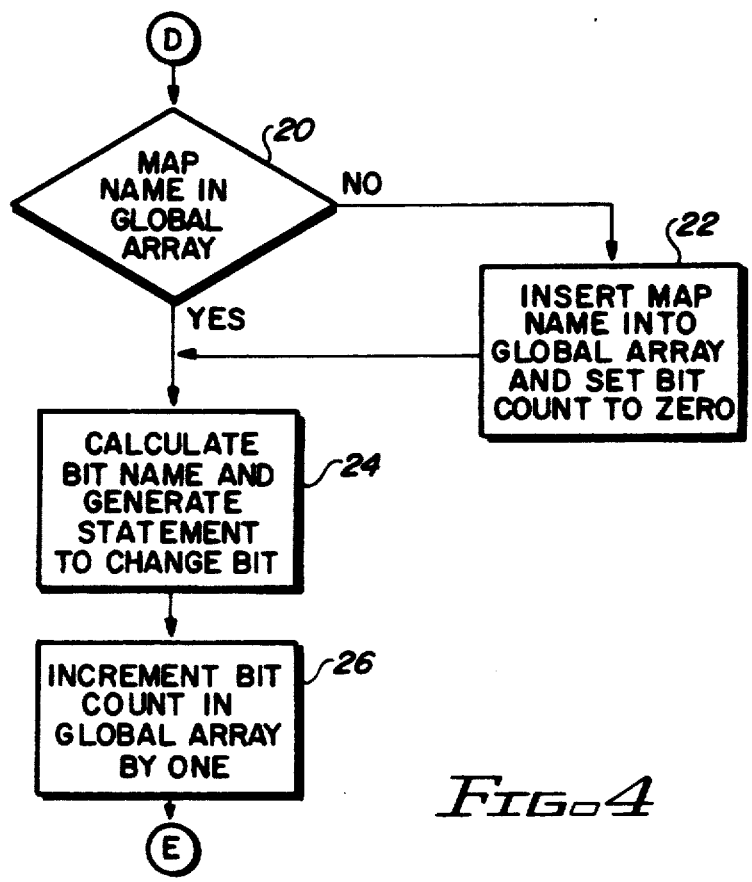
FIG. 4 is a flowchart of the SET keyword shown in FIG. 1.
Figure 5:
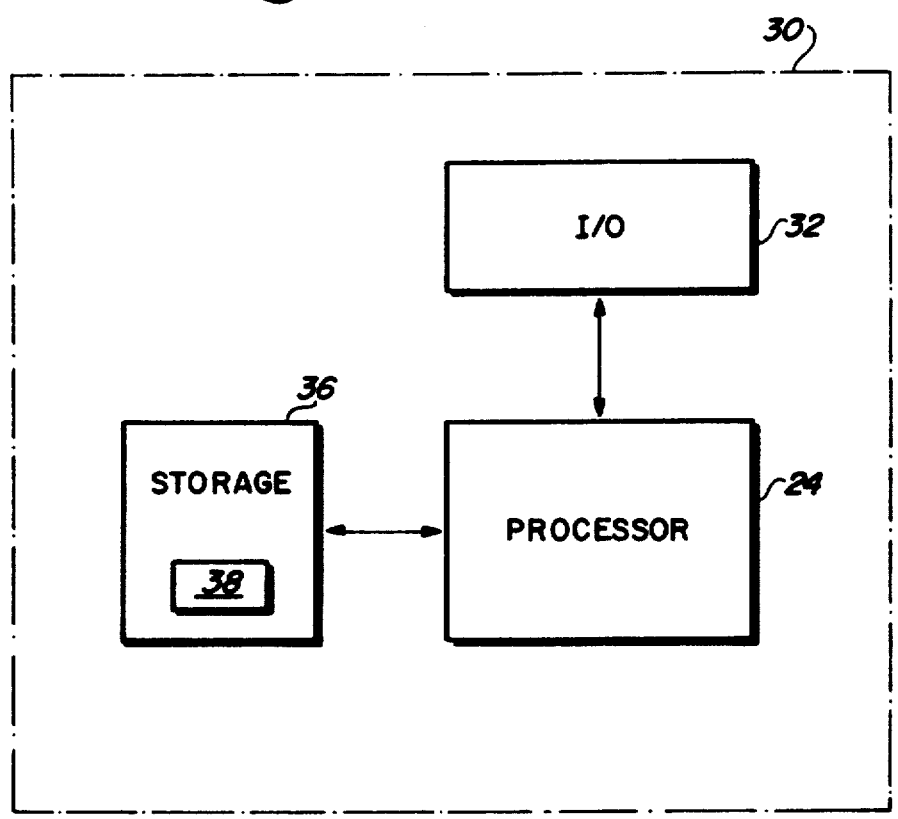
FIG. 5 is a data processing system of the present invention.

The subject tracing method includes three basic steps during target program execution. The first step is the creation of one or more bit maps by the reservation of system memory. The bit maps contain arrays of bits actually representing the trace information; the bits are set as trace points are referenced during program execution. The storage space reserved must be large enough to store the map names and the bits contained therein. Each bit in one of the bit maps is associated with a different trace point in the target program. Thus, after execution of the target program, one state (i.e. either a logical zero or one) of a particular bit in one of the bit maps indicates that the associated trace point was referenced and the other state of that same bit indicates that the associated trace point was not referenced. Because the referencing of a trace point during program execution requires that the bit maps be altered, the reservation of system memory space for storage of the bit maps must occur prior thereto.

The next basic step of the subject tracing method is to clear each of the bits in the bit maps previously stored in the system memory. As used herein, clearance of the bits refers to initializing them to a known data state. In some systems, the mere reservation of the system memory space will initialize all bits therein. In other systems, the reservation of system memory space does not initialize the data stored therein. It is necessary in such other systems to initialize the data stored in the bit maps to a known state. The known data state for initialization is typically that of all logical zeroes, but any known data state may actually be used, such as all logical ones. In the preferred embodiment of the subject invention, for tracing Data Facility Hierarchical Storage Manager (DFHSM) software sold by International Business Machines Corporation, the initialized data state is that of all logical zeroes. Thus, after the execution of DFHSM software, a logical one state of a particular bit in one of the bit maps indicates that the associated trace point was referenced and a logical zero state of that same bit indicates that the associated trace point was not referenced. It should be understood, however, that the basic step of clearing the bit maps may be combined with the previously described basic step of creating the bit maps, and is therefore in such sense not critical to the subject invention.

The third basic step of the subject tracing method is actually a series of similar operations. These operations are the actual changing of bits in the bit maps from logical zeroes to logical ones as associated trace points are referenced during execution of the target program. In alternative embodiments of the invention it is not actually necessary that the bit be changed from a zero to a one, since the initialized state of the bit may not be a zero, but merely from the known state to a different referenced state. The state of a particular bit is changed upon the first referencing of the associated trace point during program execution, and remains in the changed state during the remainder of current program execution. Subsequent referencing of the same trace point does not change or otherwise affect the changed bit. Such switching would only serve to hinder tracing because the state of a particular bit would no longer indicate whether or not the associated trace point had ever been referenced. For example, a bit changed to a logical one at the first associated referencing and then switched back to a logical zero at the second associated referencing would be indistinguishable from a bit that had never been changed at all (because of the absence of associated referencing). Thus, "setting" the state of a bit, as used herein, refers to one and only one change in state during program execution—it does not mean the bit may never again be changed, such as during subsequent executions of the same program. Again, "setting" the state of bit refers to placing the bit in a particular, referenced state—regardless of its current state, which is not checked prior to setting. If the bit is already in the referenced state, setting it will be transparent (i.e. no change in state will occur). In this manner, a bit map or series of bit maps can be produced which merely indicate the referencing of each trace point (or lack of) at some time during the execution of the target program.

It may be desirable in some instances to trace the paths used during periods of less than complete program execution, such as during execution of certain individual program modules. These periods are hereinafter referred to as "tracing intervals". Bits set during a tracing interval remain unchanged throughout the remainder of that interval, but may be reinitialized and reset during subsequent intervals. Thus, it should be understood that wherever the discussion herein refers to program execution or the like, the period of tracing may actually be a mere tracing interval.

To set a bit associated with a referenced trace point, a bit name generated especially for that unique trace point is utilized. The bit name includes three concatenated qualifiers to identify it. These qualifiers include the name of the bit map, the byte offset within the bit map, and bit position within the byte. When a trace point is referenced, the associated named bit is addressed and set.

A record of the bit maps is created using a trace recording facility, as known to one of skill in the art. A trace recording facility transfers the bit maps stored in system memory to retentive storage during or after program execution of the target program. Transfers to retentive storage may be made at various times, such as at the end of subroutines, modules, iterative loops, or other logical sections, or at regular intervals during program execution. In the preferred embodiment, the bit maps are assembled in system memory during or after each execution of each logical section of the target program and transferred to retentive memory at large, regular intervals, thereby minimizing any degradation of performance associated therewith. Examples of trace recording facilities which could be used in conjunction with the subject invention are disclosed by Hunt, T. A., (*IBM Technical Disclosure Bulletin*, Vol. 15, No. 8, Jan. 1973, pp. 2446-2448), Klein, et al, (*IBM Technical Disclosure Bulletin*, Vol. 30, No. 10, March 1988, pp. 251-253) and U.S. Pat. No. 4,598,364 to Gum, et al, all of which are hereby incorporated by reference.

After program execution the zeros and ones of the bit maps are matched to their associated trace points using the source listing of the target program. The first bit indicates whether the first trace point in the program was referenced during execution, the second bit indicates whether the second trace point in the program was referenced during execution . . . and so on. Matching of the bits and their associated trace points may be accomplished automatically through further programming, or manually after output of the bit maps stored in the trace facility in human readable form. In the preferred embodiment, matching is accomplished manually, or by an off-line comparative program, thereby preventing any degradation of target program or system performance caused by the storage and retrieval of additional information to allow for automatic matching.

The state of a particular bit indicates whether the associated trace point was referenced at least once (i.e. where the program execution proceeded), but generally provides no sequential information. The trace points in the target program are not necessarily referenced in the order in which they appear in the source listing, due to program branching, looping and the like. Because the bit maps are arranged in the order of appearance of the trace points in the source listing of the target program, and not the order of referencing during program execution, it is not generally possible to determine which of two referenced trace points was referenced first or last. The ability to store sequential tracing information, either by storing a numerical indication of the time of referencing of the associated trace points or by ordering the bit maps according to the sequence of referencing of the associated trace points, would significantly increase the system memory space and time required to accomplish the trace. As previously described, the state of a particular bit also does not generally indicate any quantitative information (i.e. how many times the associated trace point was referenced), but merely whether it was referenced at all.

Although the aforementioned sequential and quantitative information is not generally stored in the bit maps, limited amounts of such information may be obtained in the operation of the subject invention. For example, some sequential information may be generated by repeated operations of the trace recording facility during target program execution. If the trace recording facility transfers the bit maps to retentive storage at regular intervals, a comparison of the bit maps will indicate the interval during which a particular trace point was referenced. A trace point referenced during a relatively early interval would clearly have been referenced before a trace point referenced during a relatively later interval. Still, little sequential information is available from any single bit map. Some sequential and quantitative information may also be obtained through the use of multiple bit maps. In a program containing a subroutine or module to be entered more than once during program execution, and having branch points therein, separate recorded bit maps may be used to trace the path of execution of the subroutine or module each time it is entered. This is accomplished using a tracing interval equivalent to the execution of the subroutine or module. Each time the logical unit is entered the basic tracing steps of creating, clearing, and setting the bit maps is repeated—resulting in a distinct recorded bit map in retentive storage for each pass through the logical unit. Also, in a program to be entered once, but having a large complex loop with an indefinite number of cycles, one bit map could be used to generally trace the program and a separate bit map could be used for recording the distinct path of execution through each cycle.

The subject tracing method minimizes target program performance degradation. The use of single bits to indicate the referencing of trace points minimizes the memory space and time required to store the trace information. Performance is not degraded by the process of storing sequential or quantitative tracing information. Nevertheless, the tracing information recorded is enough to significantly speed the analysis of many program errors. In addition, the machine-executed ability to clear the bit maps each time the execution of the target program is invoked (or at each tracing interval) allows for continuous embedded tracing so that upon the unexpected occurrence of program execution errors, tracing is already completed, thereby eliminating the need to reset the system and repeat the execution of the program with a separate trace mechanism.

Embedded Tracing Program According to the Tracing Method and Method of Installing Such Embedded Tracing Capability in a Program An embedded tracing program is created by the simple insertion into a target program of the instructions for accomplishing the three basic steps to the tracing method, as previously described. Again, the basic steps include the reservation of system memory space to create the bit maps, the clearance of the bit maps, and the setting of the state of the bits in the bit maps when associated trace points have been referenced. The general characteristics of the target program (such as its length, purpose, etc.) are not significant to the invention. Tracing will occur during program execution provided the necessary instructions are inserted therein in a form useable by the system.

One method of installing the aforementioned tracing capability into a target program is simple manual insertion of the instructions into the program in a form useable by the program compiler in use. This may be done during actual creation of the target program. However, if a large number of trace points are required, repeatedly inserting the instructions for setting the state of the bits in the bit maps when the associated trace points have been referenced (and the other instructions) may be tedious. An easier installation method requires manual insertion into the target program source listing of simple keywords which may not be immediately understood by the program compiler, but are interpreted through the use of a macro which replaces each keyword with the full instruction required. This preferred method of installation minimizes tedious manual insertion and may easily be used in conjunction with any target program, even after its initial creation.

Referring to FIGS. 1-4, the preferred method of installing the aforementioned tracing capability into a target program will now be described. Insertion of the tracing capability is accomplished using a macro which is compiled with the target program. Three keywords, CREATE, CLEAR, and SET, are manually input into the program source listing. Because these keywords are not themselves useable by the program compiler, the macro will be called upon to process the keywords and convert them into a useable form whenever reached during compiling. After all the keywords have been processed along with the remaining source listing, the compiler will issue machine language code for the target program, including the instructions for accomplishing tracing as previously described.

FIG. 1 shows the basic flow of execution of the tracing macro. The compiler inputs a keyword to the macro at connection point A. Upon receiving the keyword, the macro determines whether it is a CREATE, CLEAR, or SET keyword. If the macro determines that the keyword is other than any of these, an error message is inserted into the source listing and compiling is halted. If one of the three keywords is located, the macro proceeds according to FIGS. 2-4 via connection points B, C, and D. After processing a keyword, the macro outputs the statements generated for input to the source listing to the compiler via connection point E.

If the keyword is found to be a CREATE keyword, the macro proceeds to connection point B. The CREATE keyword is used by the macro to insert statements into the source listing to declare the bit map headers and each individual bit therein. This means that in the actual operation of the program, when the statements generated by the CREATE keyword are reached, the system will be instructed to set aside the required amount of system memory space for the bit maps for tracing. In addition, the system will be instructed as to the name of each bit in the bit maps. These declare statements are inserted into the source listing and compiled into machine code causing the system to operate accordingly.

When the CREATE keyword is manually input, the user makes a choice between inserting the keyword before the first trace point in the source listing, accompanied by manually input map names and lengths in bits, or inserting the keyword after the last trace point in the source listing, unaccompanied by the additional information. The CREATE keyword causes the macro to take actions requiring the additional information. If the keyword is placed before the first trace point, the user must provide the macro with such information. This requires that the user have counted the number of trace points input to the target program. If the user does not want to so count, the keyword can be placed after the last trace point, thereby enabling the macro to count the trace points to generate the additional information. This feature enables the macro to be used with different numbers of trace points in the target program without forcing the user to spend time manually counting the exact number for each application.

To cause the necessary declare statements to be inserted into the source listing, the macro must first determine whether the CREATE keyboard is accompanied by manually input map names and lengths in bits. If the names and lengths are present the macro calculates the total system memory space required for all bit maps, and creates two arrays herein referred to as the name and count arrays. The name array stores the names of each bit map and the count array contains the length in bits of each bit map. From the information in these two arrays, the macro determines the unique bit names in the bit maps. As previously described, each bit name includes three qualifiers to identify it. These qualifiers include the name of the bit map, the type offset within the bit map, and the bit position within the byte. The bit map name is known from the name array. The byte offset in the bit map is calculated by dividing the current bit count for the bit map by eight. The remainder from the division is used to determine the bit offset/position within the byte. The first trace point for that bit map will then be associated with the first bit position in the first byte of that bit map. The next trace point will be associated with the next bit position in the same byte of that bit map and so forth. Given all of the above, the macro can then generate the required declare statements.

If a CREATE keyword is not accompanied by manually input bit map names and lengths in bits, it is assumed that such keyword was inserted after the last trace point in the source listing. Without the additional manual input the macro has no immediate access to knowledge of how much system memory space will need to be allocated for the bit maps or the names of the bit maps, and so cannot generate the necessary declare statements. Instead, the macro loops through a global array caused to be generated by the SET keywords to obtain the required knowledge. The generation of the global array will be further described later herein. Looping through the global array permits the macro to determine how much system memory space will need to be allocated for the bit maps and to create the name and count arrays, from which the macro can determine the bit map names and the number of bits in each map. Given the above, the macro can then generate the required declare statements.

If the macro determines that a keyword is not a CREATE keyword then it continues on to determine whether or not that keyword is a CLEAR keyword. If the keyword is a CLEAR keyword, the macro proceeds to connection point C. The presence of the CLEAR keyword causes the macro to generate statements which will, during target program execution, instruct the system to zero the bits in the specified bit maps and set the map names for the bit maps in the system memory. Zeroing the bits in the bit maps ensures that the initial state of the bit maps is known. Setting the map name for the bit maps labels them so that they can be identified and matched to their respective header by the trace recording facility. The generated statements are inserted into the source listing and compiled into machine code causing the system to operate accordingly.

If the macro determines that a keyword is neither CREATE nor CLEAR then it continues on to determine whether or not that keyword is a SET keyword. SET keywords are placed in the source listing at the desired trace points, and include a manually input map name. If the keyword is a SET keyword, the macro proceeds to connection point D. The macro reads the map name and determines whether or not such bit map name currently exists in the global array. The global array is an array of map names and the total bit count for each bit map calculated up to that point during compiling. If the bit map name is not found in the global array, the macro assumes that the SET keyword has referenced a new bit map, inserts the map name into the global array, and initializes the bit count for that bit map to zero. If the map name is found in the global array, the macro does not insert any map name into the global array and does not initialize any bit count to zero. In either case, the macro continues on to calculate the bit name associated with the current bit count in the bit map named in the manual input accompanying the SET keyword. As previously described, each bit name includes three qualifiers to identify it. These qualifiers include the name of the bit map, the byte offset within the bit map, and the bit position within the byte. The bit map name is known from the manual input. The byte offset in the bit map is calculated by dividing the current bit count for the bit map by eight. The remainder from the division is used to determine the bit position within the byte. The macro then inserts a statement into the source listing which will cause the identified bit to be set to a logical one when the statement is reached during program execution. Finally, the macro increments the pertinent bit count in the global array by one to indicate the next available bit location in the respective bit map.

The SET keywords may be manually inserted anywhere in the target program to create the desired trace points. For example, the trace point locations may be independent of the surrounding logic, but related to certain architectural keypoints of program execution. In the preferred embodiment, each trace point is logically located near a different one of the program branch points. By "near" it is not meant immediately before or after a branch point, but simply between the branch points along each possible path used in execution so that a one-to-one correspondence essentially exists between the trace points and the branch points. By placing the trace points near the branch points, the subroutines, modules, or other logical sections which have been invoked can be identified. Since each trace point consists of a single machine instruction and by only placing trace points near the branch points, the amount of tracing information obtained is maximized and the degradation of program performance is minimized.

During the operation of the macro there are several relatively insignificant tasks accomplished by the macro but not shown in the figures for convenience. These tasks relate to error message generation. For example, in response to a CREATE keyword the macro verifies whether or not a proper map name and length in bits has been specified. If the map name and length in bits are required (the CREATE keyword precedes the first trace point) but are not manually input, of if a map name and length in bits is present but is not correctly specified, the macro causes an error message to be inserted into the source listing and halts compiling. Similarly, the macro verifies whether or not a proper map name has been specified in response to the SET keyword.

While the invention has been described with respect to a preferred embodiment thereof, it will be understood by those skilled in the art that various changes in detail may be made therein without departing from the spirit, scope, and teaching of the invention. For example, the macro was described as creating three separate arrays to store data assisting in the generation of the bit maps. Alternative embodiments of storing the data may be used, such as the use of additional arrays. Accordingly, the invention herein disclosed is to be limited only as specified in the following claims.

What is claimed is:

1. A computer implemented method of identifying the path used in execution of a target computer program having a plurality of embedded trace points, the method comprising the computer machine executed steps of:

creating at least one bit map having a plurality of separately accessible bits, each of the bits logically associated with one of the trace points, such that there is a one-to-one correspondence of bits to said trace points, whereby each bit represents the status of the corresponding trace point;

placing each of the bits in a known state; and setting the state of a bit to a referenced state when a respective logically associated trace point is referenced during a tracing interval, the state of that bit being set only one.

2. The computer implemented method of claim 1 further comprising the computer machine executed steps of repeating said creating, placing and setting steps at every tracing interval.

* * * * *

UNITED STATES PATENT AND TRADEMARK OFFICE
CERTIFICATE OF CORRECTION

PATENT NO. : 5,121,489
DATED : June 9, 1992
INVENTOR(S) : P. N. ANDREWS

It is certified that error appears in the above—identified patent and that said Letters Patent is hereby corrected as shown below:

Column 12, line 9, change "one", to --once--.

Signed and Sealed this

Thirteenth Day of July, 1993

Attest:

MICHAEL K. KIRK

Attesting Officer     Acting Commissioner of Patents and Trademarks